(12) United States Patent
Schaeffer et al.

(10) Patent No.: US 9,821,908 B2
(45) Date of Patent: Nov. 21, 2017

(54) SYSTEM AND METHOD FOR ASSISTING IN ROTOR SPEED CONTROL

(71) Applicant: Bell Helicopter Textron Inc., Fort Worth, TX (US)

(72) Inventors: Joseph M. Schaeffer, Cedar Hill, TX (US); Jignesh Patel, Trophy Club, TX (US); Eric O'Neill, Great Mills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 688 days.

(21) Appl. No.: 14/297,136

(22) Filed: Jun. 5, 2014

(65) Prior Publication Data

US 2014/0363288 A1 Dec. 11, 2014

Related U.S. Application Data

(60) Provisional application No. 61/832,186, filed on Jun. 7, 2013.

(51) Int. Cl.
*B64C 27/57* (2006.01)
*B64C 27/46* (2006.01)
*G05D 1/08* (2006.01)

(52) U.S. Cl.
CPC ............. *B64C 27/57* (2013.01); *B64C 27/46* (2013.01); *G05D 1/0858* (2013.01)

(58) Field of Classification Search
CPC combination set(s) only.
See application file for complete search history.

(56) References Cited

U.S. PATENT DOCUMENTS

| | | |
|---|---|---|
| 4,980,835 A | 12/1990 | Lawrence et al. |
| 5,951,608 A | 9/1999 | Osder |
| 2004/0010354 A1 | 1/2004 | Nicholas et al. |
| 2007/0164167 A1* | 7/2007 | Bachelder ............. G05D 1/102 244/220 |
| 2008/0243313 A1 | 10/2008 | Schaeffer |
| 2008/0294305 A1* | 11/2008 | Roesch ................. B64C 27/22 701/3 |

(Continued)

FOREIGN PATENT DOCUMENTS

EP 2774845 A1 10/2014

OTHER PUBLICATIONS

European Search Report in related European Application No. 14171604.3, dated Oct. 27, 2014, 3 pages.

(Continued)

*Primary Examiner* — Edward J Pipala
(74) *Attorney, Agent, or Firm* — Timmer Law Group, PLLC (57) ABSTRACT

A method of assisting in rotor speed control in a rotorcraft can include measuring a rotor speed with a sensor; detecting a droop in the rotor speed beyond a lower droop limit; and commanding a decrease in collective in response to the rotor speed drooping beyond the lower droop limit. A system of assisting in rotor speed control in a rotorcraft, the system can include: a computer having a control law, the control law operable to generate a decrease collective command to an actuator in response to a rotor speed decreasing below a lower droop limit; wherein the lower droop limit is below a normal lower rotor speed range.

19 Claims, 5 Drawing Sheets

(56) References Cited

U.S. PATENT DOCUMENTS

| | | | | |
|---|---|---|---|---|
| 2010/0235019 A1* | 9/2010 | De Bono | ............. | G01C 23/005 |
| | | | | 701/14 |
| 2013/0221153 A1* | 8/2013 | Worsham, II | ......... | B64C 27/006 |
| | | | | 244/17.13 |
| 2014/0361118 A1* | 12/2014 | Schaeffer | ................ | B64C 27/04 |
| | | | | 244/17.13 |
| 2014/0365039 A1* | 12/2014 | Schaeffer | ................ | B64C 19/00 |
| | | | | 701/3 |

OTHER PUBLICATIONS

Communication in related European Application No. 14171604.3, dated Nov. 13, 2014, 6 pages.
Communication under Rule 71(3) EPC—Intention to Grant, dated Jul. 9, 2015, regarding EP Application No. 14171604.3.

* cited by examiner

SYSTEM AND METHOD FOR ASSISTING IN ROTOR SPEED CONTROL

BACKGROUND

Technical Field

The present disclosure relates to a system and method of assisting in rotor speed control. More specifically, the system and method provides rotor speed control during rotor speed excursions outside of a normal rotor speed envelope.

Description of Related Art

Conventionally, certain rotorcraft have employed some level of rotor speed control in a fly by wire flight control system. For example, rotor speed can be controlled by an engine control unit. However, controlling rotor speed with the engine control unit has shortcomings in certain situations.

There is a need for an improved flight control system.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The method and system of the present disclosure can provide rotor speed envelope protection against several types of failures, or degraded operation. One benefit is after a dual engine failure; however, it will also provide envelope protection functionality during a full authority digital engine control (FADEC) failure, aggressive rotorcraft pitch-over maneuvers, aggressive pitch-up maneuvers with high torque, and rapid collective inputs, for example. The system is configured such that it detects that a rotor excursion is too great, and it adjusts collective to maintain rotor speed within desired limits. The system is enabled during normal operation and does not depend on detecting a dual engine failure. Moreover, one benefit of the system and method is that detection of an engine failure is not required. Certain rotor systems can dangerously and quickly lose rotor speed prior to a detection of an engine failure, therefore, the system and method of the present disclosure provide safety by detecting the loss in rotor speed and temporarily reducing or eliminating rotor speed control responsible from an engine control unit to a collective control until the rotor speed is back within a normal rotor speed envelope.

Figure 1:
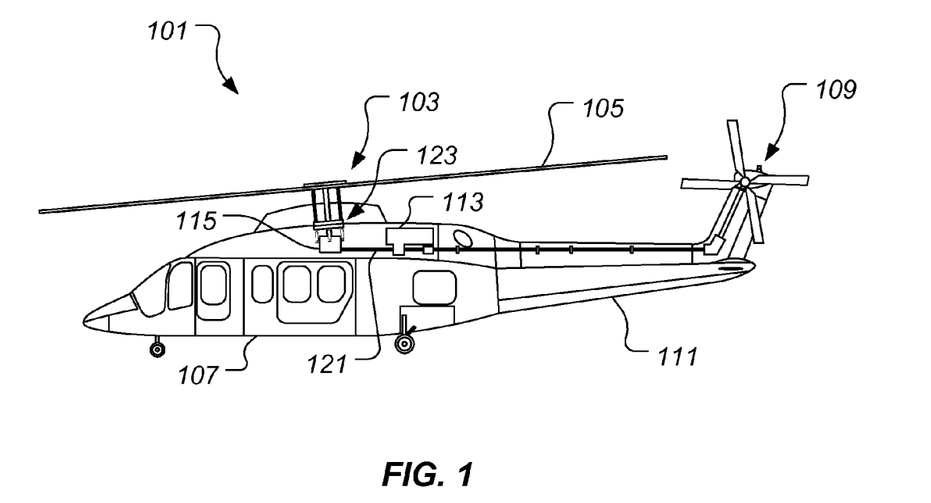
FIG. 1 is a side view of an rotorcraft, according to one example embodiment.

Referring now to FIG. 1 in the drawings, a rotorcraft 101 is illustrated. Rotorcraft 101 can include a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. It should be appreciated that swashplate mechanism 123 is merely exemplary of one possible system for selectively controlling the pitch of rotor blades 105; for example, an independent blade control system is another exemplary system for selectively controlling the pitch of rotor blades 105. Rotorcraft 101 can include an airframe 107, anti-torque system 109, and an empennage 111. Torque can be supplied to rotor system 103 and anti-torque system 109 with at least one engine 113. A main rotor gearbox 115 is operably associated with an engine main output driveshaft 121 and the main rotor mast.

Rotorcraft 101 is merely illustrative of the wide variety of aircraft and vehicles that are particularly well suited to take advantage of the method and system of the present disclosure. It should be appreciated that other aircraft can also utilize the method and system of the present disclosure.

A rotorcraft with a low inertia rotor system may especially benefit from the system and method of the present disclosure.

Figure 2:
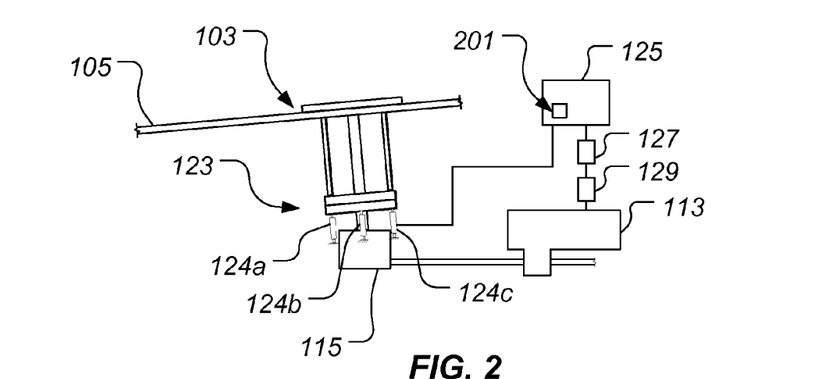
FIG. 2 is a partially schematic view of rotorcraft systems, according to one example embodiment.

Referring now also to FIG. 2 in the drawings, a system 201 is illustrated in conjunction with rotorcraft 101. It should be appreciated that though system 201 is illustrated with regard to rotorcraft 101, system 201 is also implementable on other aircraft as well. Further, it should be appreciated that system 201 can be implemented in a wide variety of configurations, depending in part on the flight control configuration of the aircraft.

System 201 is particularly well suited for implementation in aircraft having a fly-by-wire flight control computer, such as flight control computer 125; however, a partial fly-by-wire aircraft can also utilize system 201. For example, system 201 can be utilized with a flight control system having collective actuators 124a, 124b, and 124c that can receive commands from a trim motor, autopilot system, or any other system that allows collective commands to be realized by collective actuators 124a, 124b, and 124c. Further, system 201 is particularly well suited for implementation with aircraft having an engine controlled by an engine control unit 127, such as a FADEC (full authority digital engine control) system. However, system 201 can also be implemented on an aircraft having an engine that is not controlled by an engine control unit 127, in such an embodiment, system 201 can make fuel control commands directly to a fuel control unit 129, for example.

Figure 3:
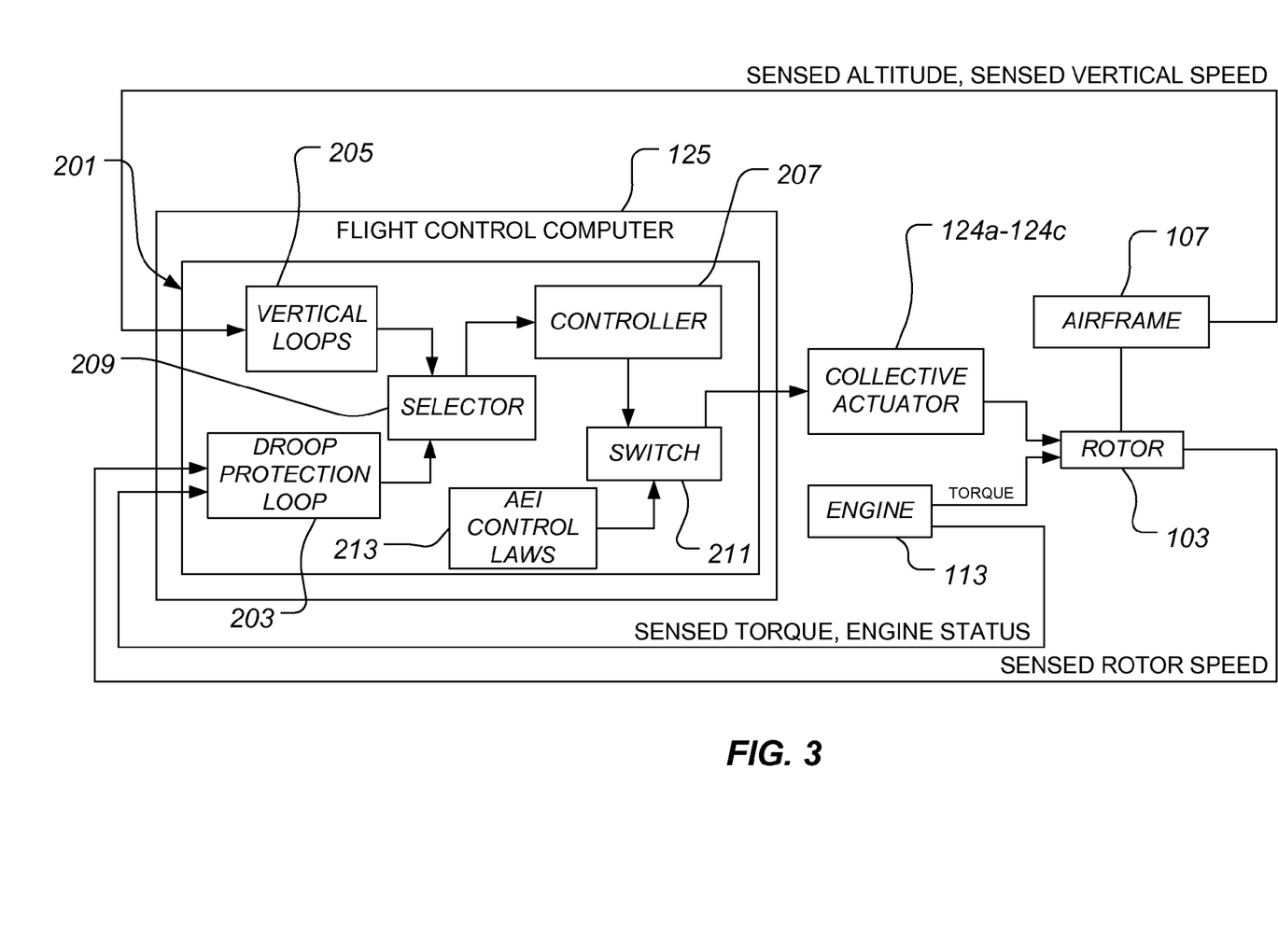
FIG. 3 is a schematic view of a system, according to one example embodiment.

Referring now also to FIG. 3, a schematic view of system 201 is schematically illustrated in conjunction with features of rotorcraft 101. System 201 is configured as an interface between engine 113, airframe 107, flight control computer 125, and collective actuators 124a-124c. The flight control computer 125 uses data from the engine 113 and rotor system 103 to calculate a collective pitch command. Any number and variety of sensors can be utilized to provide certain data to flight control computer 125 and system 201. System 201 is preferably integrated with flight control computer 125; however, in another embodiment system 201 can be a standalone computer system within the aircraft. As discussed further herein, flight control computer 125 and system 201 can include computer related equipment, such as processors and the like for performing associated functions.

Still referring to FIG. 3, system 201 can include control laws, which are illustrated as vertical loops 205. Vertical loops 205 can include vertical axis control laws configured to make control commands so that the rotorcraft can hold a desired vertical axis state, such as vertical speed or vertical altitude, for example. For example, the vertical loops 205 can adjust for differences between a commanded vertical state and an actual vertical state. One example can be if rotorcraft 101 is directed to hold a commanded altitude, but rotorcraft 101 experiences a sudden updraft of wind, then the vertical loops 205 can in response generate commands to collective actuators 124a-124c in order to decrease pitch and thrust in order to maintain the commanded altitude.

System 201 can also include a controller 207 configured to adjust a received command to minimize an error signal and then send output adjusted commands to collective actuators 124a-124c. In one embodiment, controller 207 includes a proportional plus integral (P+I) functionality; however, it should be appreciated that controller 207 may include any implementation specific desired functionality.

One unique feature of system 201 is the inclusion of a droop protection loop 203. Droop protection loop 203 is configured to detect a drop in rotor speed beyond a droop rotor speed limit (i.e. 7% below commanded). The droop rotor speed limit is set below a lower normal rotor speed range (i.e. 3% below commanded) that may occur during normal maneuvers, and then make a decrease collective command to collective actuators 124a-124c in order to quickly increase rotor speed. The rotorcraft 101 will experience a nonpilot commanded decrease in altitude, but this is better than continuing to lose valuable rotor speed. One embodiment of droop protection loop 203 is described in FIG. 4, as discussed further herein. During normal operation, rotor speed is regulated by an engine control unit of engine 113; moreover, if the pilot were to increase collective pitch, the rotors would naturally tend to slow down due to the increase in aerodynamic resistance; however, the engine control unit would sense or anticipate such an affect and increase fuel to the engine to increase engine power and engine speed. Therefore, the collective commands from droop protection loop 203 are only realized when the droop protection loop 203 generates decrease collective commands that are less than the decrease collective commands make by vertical loops 205. A selector 209 can be configured to choose the lesser of the decrease pitch commands made by vertical loops 205 and droop protection loop 203. The commands generated by droop protection loop 203 can be output to controller 207 and then to a switch 211. Switch 211 is configured to communicate commands from controller 207 by default; however, switch 211 will instead communicate commands from all engines inoperative (AEI) control laws 213 upon the detection of engine failure, or other implementation specific criteria. Thus, if a rapid drop in rotor speed is sensed, but the engine failure is not yet detected, then droop activation loop 203 will function to send decrease collective commands to collective actuators 124a-124c only until switch 211 turns authority over to AEI control laws 213, such as after detection of engine failure. AEI control laws 213 can include autorotation control laws that will assist in the autorotation and safe landing of the rotorcraft 101. It should be appreciated that in such a scenario, droop activation loop 203 will function to provide the important function of preserving rotor speed so that a more effective autorotation can be performed with the assistance of AEI control laws 213. It should be appreciated that AEI control laws 213 are configured so that the pilot can have the ability to directly control the collective pitch in order to deliberately cause the rotor speed to decay during the autorotation flare and landing without activation of droop protection loop 203.

One challenge of a rotorcraft, such as rotorcraft 101, with a low inertia rotor system 103, is an immediate and large compensation is required to control rotor speed after a dual engine failure. Pilot reaction time may not be sufficient to prevent excessive rotor speed decay. For many types of engine failures, the engine failure will not be detected until the rotor has already drooped significantly or excessively. One advantage is that system 201 provides immediate compensation with a large authority/bandwidth (faster than the pilot) and does not depend on detection of an engine failure.

System 201 is configured to selectively activate the droop protection loop 203 which reduces collective rotor blade pitch based upon rotor speed decay. The droop protection loop 203 is configured such that collective input commands will not be made during normal rotor speed excursions, but rather after a decrease in rotor speed beyond a lower rotor speed limit that is well beyond normal rotor speed excursions, but before an excessive reduction in rotor speed. In one illustrative embodiment, droop protection loop 203 can be activated when rotor speed decreases below a droop rotor speed limit, such as 5% below commanded rotor speed, to name one example. The activation conditions can be a function of commanded rotor speed and/or other aircraft conditions (such as to allow greater rotor speed droop at low altitude, for example). Moreover, system 201 can be configured to adjust the droop rotor speed limit lower at high altitude (such as 10% of commanded, for example) and adjust the droop rotor speed limit higher (such as 5% of commanded, for example) at low altitude.

In one example embodiment, system 201 can be configured with an overspeed protection loop in order to prevent the rotor speed from possibly overspeeding due to inflow dynamics. Due to the slower transients, the overspeed protection can be lower bandwidth and lower authority.

Figure 4:
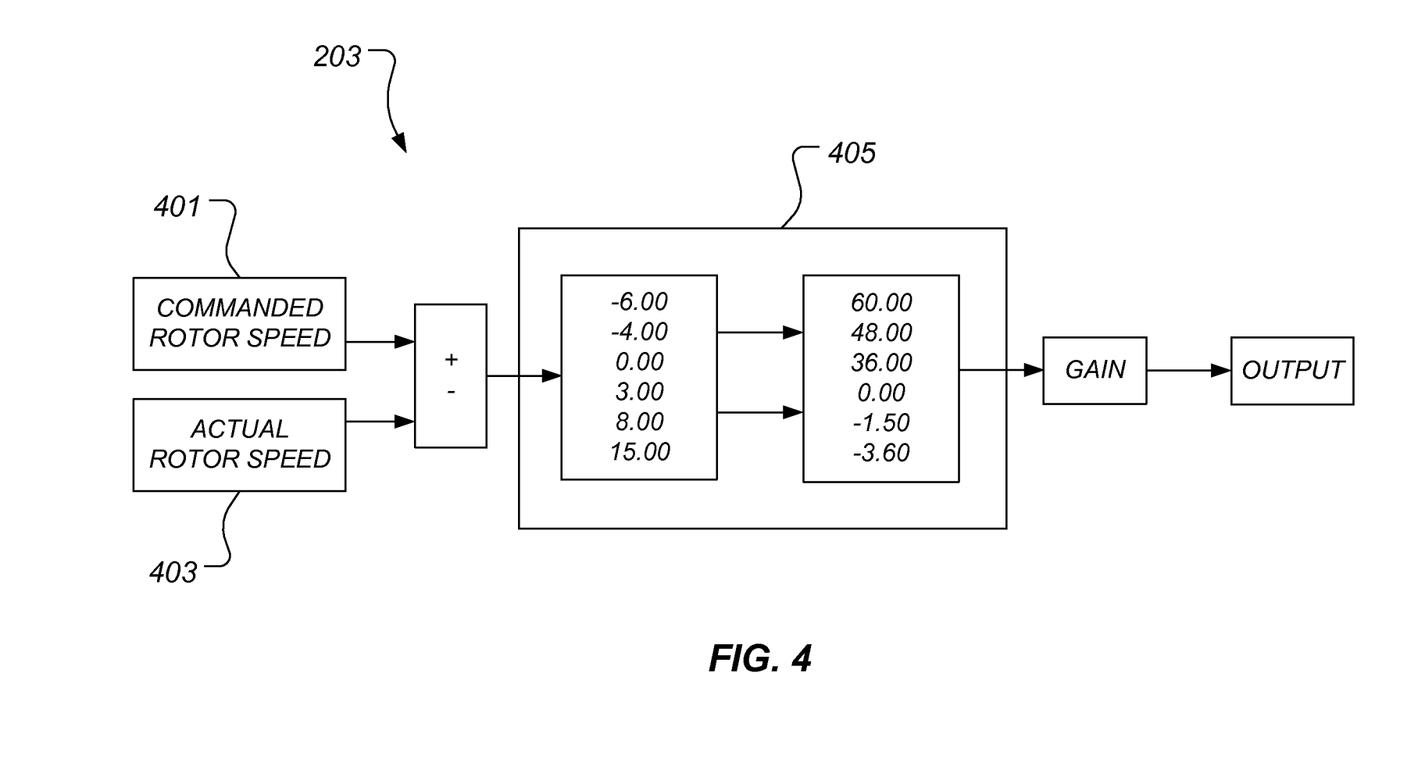
FIG. 4 is a schematic view of a droop protection loop, according to one example embodiment.

Referring now also to FIG. 4, one embodiment of droop protection loop 203 is illustrated in further detail. Values associated with a commanded rotor speed 401 and an actual rotor speed 403 are correlated with values in table 405. The table 405 provides flexibility over a standard linear/gain system, in that it serves to prevent inadvertent limiting of the vertical command, while allowing more aggressive collective decrease for larger rotor speed decreases. When the difference between commanded rotor speed 401 and actual rotor speed 403 is small, the table output is a large value, which allows a high authority on the vertical speed command. As the rotor speed droops closer to the specified limit (in this case, 3%), the table output decreases, which reduces the authority of the vertical command. Once rotor speed droops below 3%, the table output is negative, which would result in a decrease in collective. The values in the lower portion of table 405 allow for more aggressive decrease in collective for larger rotor speed droops due to the nonlinear relationship therebetween. In the example shown, for rotor speed decreases between 3 and 8%, the value in table 405 decreases from 0 to −1.5. When rotor speed decreases below 8%, the table output decreases more steeply.

Figure 5:
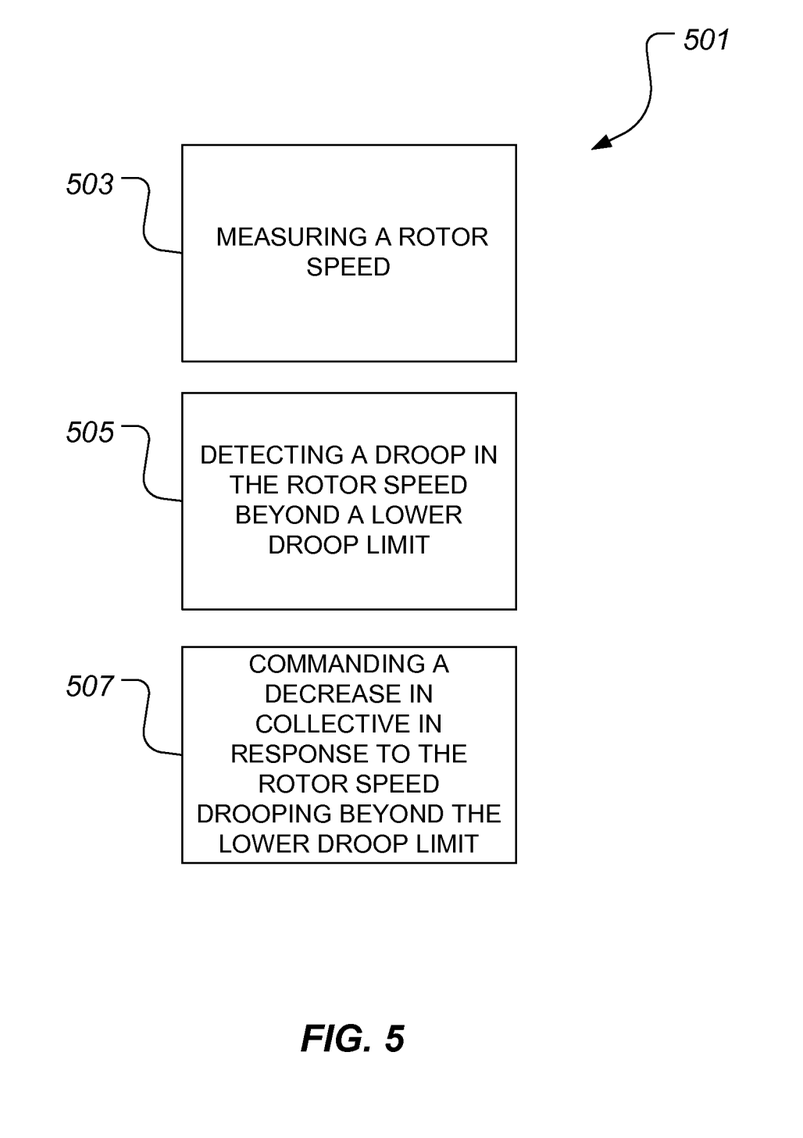
FIG. 5 is a schematic view of a method, according to one example embodiment.

Referring now also to FIG. 5, a method 501 of assisting in rotor speed control in a rotorcraft includes a step 503 of measuring a rotor speed with a sensor; at step 505 of detecting a droop in the rotor speed beyond a lower droop limit; and a step 507 of commanding a decrease in collective in response to the rotor speed drooping beyond the lower droop limit.

The system and method of the present disclosure successfully transitions between engine throttle governing and collective pitch governing to control rotor speed. The system and method allows collective pitch governing in circumstances when rotor speed has dropped beyond a threshold that is well below normal operating ranges. The system and method prevents excessive rotor speed droop after a dual engine failure, without requiring engine failure detection. As such, it is robust to delayed engine failure detection and nuisance engine failure declarations. A dual engine failure detection is not required for initial operation, but can be used to improve long term response. One benefit of the system of the present disclosure is that it will aid the pilot in an emergency situation, greatly relieving the requirement for immediate pilot action. It reduces pilot workload after a dual engine failure.

Figure 6:
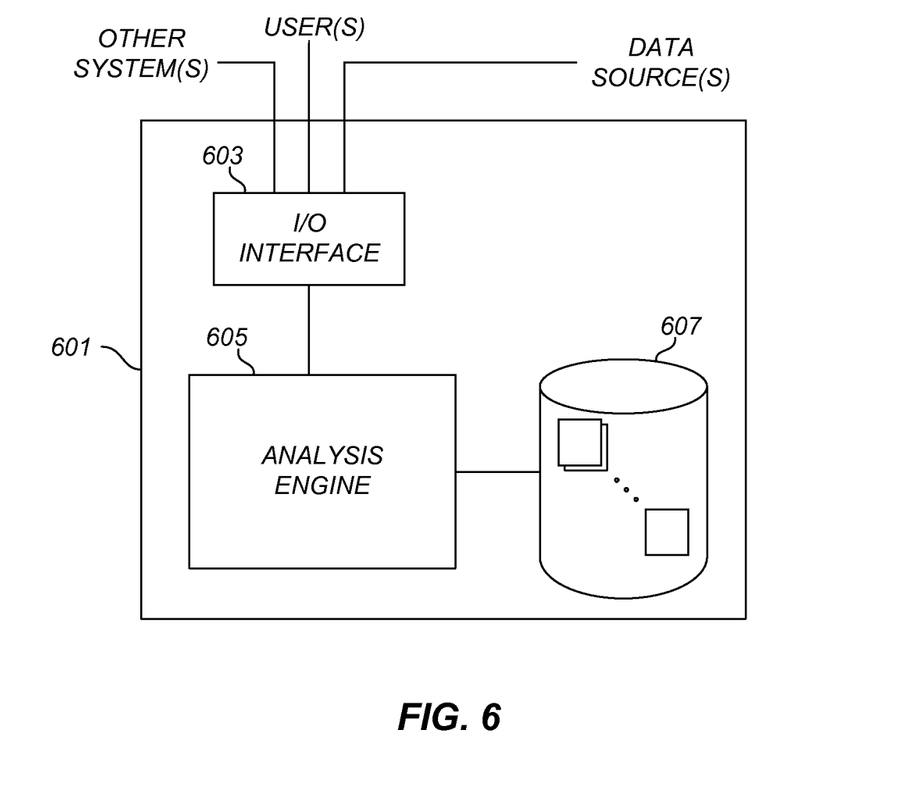
FIG. 6 is a schematic view of a computer system, according to one example embodiment.

Referring now also to FIG. 6, a computer system 601 is schematically illustrated. Computer system 601 can be configured for performing one or more functions with regard to the operation of system and method further disclosed herein. Further, any processing and analysis can be partly or fully performed by computer system 601. Computer system 601 can be partly or fully integrated with other aircraft computer systems.

The system 601 can include an input/output (I/O) interface 603, an analysis engine 605, and a database 607. Alternative embodiments can combine or distribute the input/output (I/O) interface 603, analysis engine 605, and database 607, as desired. Embodiments of the system 601 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multipurpose machines, for example computer workstations, that are suitable for also performing other tasks.

The I/O interface 603 can provide a communication link between external users, systems, and data sources and components of the system 601. The I/O interface 603 can be configured for allowing one or more users to input information to the system 601 via any known input device. Examples can include a keyboard, mouse, touch screen, and/or any other desired input device. The I/O interface 603 can be configured for allowing one or more users to receive information output from the system 601 via any known output device. Examples can include a display monitor, a printer, cockpit display, and/or any other desired output device. The I/O interface 603 can be configured for allowing other systems to communicate with the system 601. For example, the I/O interface 603 can allow one or more remote computer(s) to access information, input information, and/or remotely instruct the system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the system 601 to perform one or more of the tasks described herein.

The database 607 provides persistent data storage for system 601. While the term "database" is primarily used, a memory or other suitable data storage arrangement may provide the functionality of the database 607. In alternative embodiments, the database 607 can be integral to or separate from the system 601 and can operate on one or more computers. The database 607 preferably provides non-volatile data storage for any information suitable to support the operation of system 201 and method 501, and various embodiments thereof, including various types of data discussed further herein. The analysis engine 605 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A system of assisting in rotor speed control in a rotorcraft, the system comprising:
a computer having a control law, the control law operable to generate a decrease collective command to an actuator in response to a rotor speed decreasing below a lower droop limit;
wherein the lower droop limit is below a normal lower rotor speed range; and
wherein the actuator is a collective actuator configured to cause a pitch change in a rotor blade as a function of the decrease collective command to provide an initial increase in rotor speed.

2. The system according to claim 1, wherein the control law is operable to generate the decrease collective command without the detection of an engine failure.

3. The system according to claim 1, further comprising:
a sensor configured for measuring the rotor speed.

4. The system according to claim 1, wherein the lower droop limit is a function of a difference between a commanded rotor speed and the rotor speed.

5. The system according to claim 1, wherein the computer is further operable to at least partially remove collective command authority from a vertical loops control law, the vertical loops control law being configured to make collective commands so that the rotorcraft can hold a desired vertical axis state.

6. The system according to claim 1, wherein the computer is a flight control computer located in the rotorcraft.

7. The system according to claim 1, wherein the rotor speed decreasing below the lower droop limit is due to an undetected engine failure.

8. The system according to claim 1, wherein the rotor speed decreasing below the lower droop limit is due to a pilot commanded pitch-up maneuver.

9. A method of assisting in rotor speed control in a rotorcraft, the method comprising:
measuring a rotor speed with a sensor;
detecting a droop in the rotor speed beyond a lower droop limit; and
commanding a decrease in collective in response to the rotor speed drooping beyond the lower droop limit;
controlling a collective actuator to cause a pitch change in a rotor blade as a function of the commanded decrease in collective to provide an initial increase in rotor speed.

10. The method according to claim 9, wherein the lower droop limit is below a normal lower rotor speed range.

11. The method according to claim 9, wherein the lower droop limit is a function of a difference between a commanded rotor speed and an actual rotor speed.

12. The method according to claim 9, further comprising:
at least partially removing collective command authority from a vertical loops control law.

13. The method according to claim 9, further comprising:
switching collective command authority to an all engine inoperative control law after a detection of an engine failure.

14. The method according to claim 9, wherein the step of detecting the droop in the rotor speed beyond the lower droop limit is performed by a computer.

15. The method according to claim 9, wherein the step of commanding the decrease in collective in response to the rotor speed drooping beyond the lower droop limit includes communicating a command to a collective actuator.

16. The method according to claim 9, wherein the droop in the rotor speed beyond a lower droop limit is due to an undetected engine failure.

17. The method according to claim 9, further comprising:
adjusting the lower droop limit according to an altitude of the rotorcraft.

18. The method according to claim 9, wherein the lower droop limit is adjusted higher at lower altitudes and adjusted lower at higher altitudes.

19. The method according to claim 9, wherein a magnitude of the decrease in collective has a nonlinear relationship to an amount of the rotor speed drooping beyond the lower droop limit, such that the magnitude of the decrease in collective exponentially increases as the amount of the rotor speed drooping beyond the lower droop limit increases.

* * * * *

UNITED STATES PATENT AND TRADEMARK OFFICE
CERTIFICATE OF CORRECTION

PATENT NO. : 9,821,908 B2
APPLICATION NO. : 14/297136
DATED : November 21, 2017
INVENTOR(S) : Joseph M. Schaeffer et al.

Page 1 of 2

It is certified that error appears in the above-identified patent and that said Letters Patent is hereby corrected as shown below:

On the Title Page

Below Abstract, delete "19 Claims, 5 Drawing Sheets" and insert --17 Claims, 5 Drawing Sheets--

In the Claims

Column 7, Line 2, cancel the text beginning with "1. A system of assisting" to and ending with "increase in rotor speed." in Column 7, Line 13, and insert the following claim:
--1. A flight control system for assisting in rotor speed control in a rotorcraft, the rotorcraft having a rotor blade and a collective actuator for controlling a pitch of the rotor blade, the system comprising:
    a vertical loop operable to make collective commands to the collective actuator so that the rotorcraft can hold a desired vertical axis state;
    a droop protection loop operable to generate a decrease collective command to the collective actuator in response to a rotor speed decreasing below a lower droop limit; and
    a selector configured to choose the droop protection loop when the decrease collective command is less than the collective command made by the vertical loop;
wherein the lower droop limit is below a normal lower rotor speed range.--

Column 7, Line 14, cancel the text beginning with "2. The system according to claim 1" to and ending with "an engine failure." in Column 7, Line 16, and insert the following claim:
--2. The system according to claim 1, wherein the droop protection loop is operable to generate the decrease collective command without the detection of an engine failure.--

Column 7, Line 22, cancel the text beginning with "5. The system according to claim 1" to and ending with "vertical axis state." in Column 7, Line 27, and insert the following claim:
--5. The system according to claim 1, further comprising an all engines inoperative system that is automatically engaged to make collective commands to the collective actuator when an engine failure is detected.--

Signed and Sealed this
Twenty-fifth Day of September, 2018

Andrei Iancu
*Director of the United States Patent and Trademark Office*

CERTIFICATE OF CORRECTION (continued)
U.S. Pat. No. 9,821,908 B2

Column 7, Line 28, cancel the text beginning with "6. The system accordingly to claim 1" to and ending with "in the rotorcraft." in Column 7, Line 29, and insert the following claim:
--6. The system according to claim 1, wherein the flight control system is located on a flight control computer in the rotorcraft.--

Column 7, Line 36, cancel the text beginning with "9. A method of assisting" to and ending with "increase in rotor speed" in Column 8, Lines 5 and 6, and insert the following claim:
--9. A flight control method for assisting in rotor speed control in a rotorcraft, the rotorcraft having a rotor blade and a collective actuator for controlling a pitch of the rotor blade, the method comprising:
    measuring a rotor speed with a sensor;
    controlling the vertical axis state of the rotorcraft with a vertical loop;
detecting a droop in the rotor speed beyond a lower droop limit; and
commanding a decrease in collective to the collective actuator in response to the rotor speed drooping beyond the lower droop limit;
wherein during the commanding a decrease in collective step, the collective command authority of the vertical loop is at least partially removed.--

Column 8, Line 12 - Column 8, Line 40, delete Claims 12-19 and substitute with the following Claims 12-17:
12. The method according to claim 9, further comprising:
    switching collective command authority to an all engine inoperative control law after a detection of an engine failure.

13. The method according to claim 9, wherein the step of detecting the droop in the rotor speed beyond the lower droop limit is performed by a computer.

14. The method according to claim 9, wherein the droop in the rotor speed beyond a lower droop limit is due to an undetected engine failure.

15. The method according to claim 9, further comprising:
    adjusting the lower droop limit according to an altitude of the rotorcraft.

16. The method according to claim 9, wherein the lower droop limit is adjusted higher at lower altitudes and adjusted lower at higher altitudes.

17. The method according to claim 9, wherein a magnitude of the decrease in collective has a nonlinear relationship to an amount of the rotor speed drooping beyond the lower droop limit, such that the magnitude of the decrease in collective exponentially increases as the amount of the rotor speed drooping beyond the lower droop limit increases.